United States Patent
Shinozaki et al.

(10) Patent No.: US 7,885,744 B2
(45) Date of Patent: Feb. 8, 2011

(54) CONTROLLERS FOR HEAVY DUTY INDUSTRIAL VEHICLE

(75) Inventors: Akiko Shinozaki, Sagamihara (JP); Hiroyuki Suzuki, Sagamihara (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 993 days.

(21) Appl. No.: 10/573,043

(22) PCT Filed: Sep. 17, 2004

(86) PCT No.: PCT/JP2004/013613
§ 371 (c)(1),
(2), (4) Date: Feb. 23, 2007

(87) PCT Pub. No.: WO2005/031482
PCT Pub. Date: Apr. 7, 2005

(65) Prior Publication Data
US 2007/0173999 A1    Jul. 26, 2007

(30) Foreign Application Priority Data
Sep. 26, 2003    (JP) ............................. 2003-335195

(51) Int. Cl.
G06F 19/00    (2006.01)
(52) U.S. Cl. ....................................................... 701/50
(58) Field of Classification Search ................... 701/50, 701/1; 37/414; 172/1–3
See application file for complete search history.

(56) References Cited

U.S. PATENT DOCUMENTS

| 5,796,936 | A | 8/1998 | Watabe et al. |
| 6,012,004 | A * | 1/2000 | Sugano et al. ................. 701/33 |
| 6,336,067 | B1 | 1/2002 | Watanabe et al. |
| 7,379,806 | B2 * | 5/2008 | Lee .............................. 701/50 |
| 2002/0099487 | A1 | 7/2002 | Suganuma et al. |

FOREIGN PATENT DOCUMENTS

| CN | 1315275 A | 10/2001 |
| EP | 1 227 007 A3 | 7/2002 |
| GB | 2 319 357 A | 5/1998 |
| JP | 6-250869 A | 9/1994 |
| JP | 11-158935 A | 6/1999 |
| JP | 2000-165422 A | 6/2000 |
| JP | 2001-265582 A | 9/2001 |
| JP | 2002-221075 A | 8/2002 |
| JP | 2004-220326 A | 8/2004 |

OTHER PUBLICATIONS

Anonymous: "Computer software" [Online], Oct. 14, 2010, XP002605335.

* cited by examiner

*Primary Examiner*—Yonel Beaulieu
(74) *Attorney, Agent, or Firm*—Birch, Stewart, Kolasch & Birch, LLP (57) ABSTRACT

Hardware of each of controllers (11, 12, 13) for controlling a plurality of instruments to be controlled, which are provided in a reach stacker as a heavy duty industrial vehicle, for example, a vehicle body (3), a spreader (9), and a cabin (10), is rendered common. The configuration of driver software for performing basic control is also rendered common. Only the configuration of minimum required application software is constructed to be suitable for the instrument to be controlled. Because of these features, the software of the controllers (11, 12, 13) can be easily changed. Regardless of the instrument to be controlled, as a subject of control, the controllers can be easily used for any instruments to be controlled.

6 Claims, 5 Drawing Sheets

| | Common Controller | Reach Stacker | Heavy Duty F/L | M/G (Working Machine) | M/G (Heavy EAT) |
|---|---|---|---|---|---|
| Pulse input | 4 | 2 | 2 | 1 | 3 |
| Serial | Synchronous:1 Asynchronous:1 CAN:1 | Asynchronous : 1 CAN: 1 | Asynchronous:1 CAN:1 | Synchronous:1 Asynchronous:1 | Synchronous:1 Asynchronous:1 |
| Servo valve output | 5 | Vehicle body:3 Spreader : 2 | Lift, tilt:2 Spreader:3 | 5 | 4 |
| Electromagnetic valve output | 12 | Vehicle body:12 Spreader:12 | Vehicle body:8 Spreader:8 | 1 | 7 |
| Analog input | 15 | Vehicle body:13 Cabin:5 | Vehicle body:7 Cabin:9 | 6 | 6 |
| Analog output | 2 | 2 | 2 | 0 | 0 |
| Contact input | 24(24V) 8(5V) | Vehicle body:17(24V) Cabin:22(24V) 1(5V) Spreader:8(24V) | Nearly the same as on the left | Versatile:8(5V) DIPSW:20 (For internal setting) | Versatile:2 Setting input:8(24V) 8(5V) DIPSW : 8 (For internal setting) |
| Contact output | 13(24V) 5(5V) | Vehicle body:2 (5V) Cabin:7(24V) Spreader:4(24V) | Nearly the same as on the left | Versatile:5 (24V) For PWM data:8 | Lamp output 4(24V) |

CONTROLLERS FOR HEAVY DUTY INDUSTRIAL VEHICLE

BACKGROUND OF THE INVENTION

1. Field of the Invention

This invention relates to controllers which are used for heavy duty industrial vehicles, for example, a reach stacker as a cargo handling vehicle, and a motor grader as a road surface maintenance vehicle.

2. Description of the Related Art

A heavy duty industrial vehicle not only has a vehicle moving by itself, but also has a working machine unique to the vehicle. Thus, this type of industrial vehicle is adapted to be capable of performing a predetermined working action with the use of the working machine. Some of such heavy duty industrial vehicles use one controller to control not only the moving action of the vehicle, but also the working action of the working machine, thus controlling the entire vehicle. Some other heavy duty industrial vehicles have separate controllers, such as a controller for the moving action of the vehicle, and a controller for the working action of the working machine, and connect these controllers by a network to control the entire vehicle.

Patent Document 1: Japanese Patent Application Laid-Open No. 2000-165422

SUMMARY OF THE INVENTION

Problems to be Solved by the Invention

With a configuration in which the entire vehicle is controlled by use of a single controller, control signals to a plurality of instruments to be controlled can be concentrated on the single controller. Thus, software can be constructed in a simple configuration, even when the instruments to be controlled are caused to cooperate. However, a malfunction in one controller would bring the actions of the entire vehicle to a halt. In the heavy duty industrial vehicle, moreover, wirings for control signals from the controller to the instruments to be controlled extend over long distances, and the number of the wirings is large, thus increasing the complexity of the steps for designing and assemblage. Moreover, the parts to be operated are many. Consequently, possibilities are high for malfunctions due to poor contact of the wiring when in use, a break in the wire, and so on.

In recent years, use has been made of a method in which a dedicated controller is provided for each of the instruments to be controlled, and the respective controllers are connected by a network to control the actions of the entire vehicle. According to this method, however, the controller composed of dedicated hardware is used for each of the instruments to be controlled. Thus, software needs to be designed individually, and the design of the software is itself complicated. Furthermore, some of the capabilities of the controller, for example, the communication capability, may be rendered common among the controllers. However, the instrument to be controlled by one controller is limited to a particular instrument, or the position of installation of the controller is limited to a predetermined position, and only the particular instrument to be controlled, which is suitable for the particular position of installation, is controlled. Thus, commonality of hardware is insufficient. Besides, software itself needs to be constructed beforehand individually for each of the controllers, and maintainability at the time of failure remains unchanged from that of the controller having the dedicated hardware. That is, the conventional controller has not achieved complete commonality of hardware itself, and has required individual construction of software adapted for the instrument to be controlled as a subject of control. Hence, none of the conventional controllers have been easily divertible to use on any instruments to be controlled.

The aforementioned heavy duty industrial vehicles, in particular, are used under harsh service conditions, and if a partial failure stops the action of the entire vehicle, work may be markedly impeded. Thus, it has been desired that in the event of a partial failure, minimum function could be performed so as not to impede work, and a repair operation could also be promptly carried out.

The present invention has been accomplished in light of the above-mentioned problems. An object of the present invention is to provide controllers for a heavy duty industrial vehicle, which have many input/output functions, which are highly versatile, and whose software is easy to change.

Means for Solving the Problems

Controllers for a heavy duty industrial vehicle according to a first aspect of the present invention, for solving the above problems, are a plurality of controllers which are provided in the heavy duty industrial vehicle equipped with a working machine for performing predetermined work; which control, independently of each other, a plurality of instruments to be controlled, including the working machine, the instruments being provided in the heavy duty industrial vehicle; and which are characterized in that the configuration of hardware of the plurality of controllers is entirely common.

Concretely, not only the configuration of the hardware inside each of the controllers is rendered common, but also the positions of disposition, and the numbers, etc., of connectors serving as interfaces with input and output signals (for example, serial signals, analog signals, and digital signals) to and from external instruments to be controlled are rendered common. Depending on the instruments to be controlled, the types, capacities (e.g., voltage), and numbers of the input and output signals required are different. However, the maximum required types, capacities and numbers are provided in common.

The controllers for a heavy duty industrial vehicle according to a second aspect of this invention, which solve the above problems, are the above controllers for a heavy duty industrial vehicle, where in the plurality of controllers are interconnected by a network.

As the network, CAN (controller area network) bus, which is used mainly in automobiles, connects the controllers together. Particularly, high-speed CAN bus with several Mbps or more is desirable.

The controllers for a heavy duty industrial vehicle according to a third aspect of this invention, which solve the above problems, are the above controllers for a heavy duty industrial vehicle, wherein software for controlling each of the instruments to be controlled is of a hierarchical structure, driver software at a lower level for directly controlling each of the instruments to be controlled is common, and only application software at an upper level utilizing the driver software is different according to the function of each of the instruments to be controlled.

The controllers for a heavy duty industrial vehicle according to a fourth aspect of the invention, which solve the above problems, are the above controllers for a heavy duty industrial vehicle, further including rewriting means is provided for making only the application software rewritable.

The controllers for a heavy duty industrial vehicle according to a fifth aspect of this invention claim 5, which solve the above problems, are the above controllers for a heavy duty industrial vehicle, further including limited operation means is provided for enabling an operation by other controller so that at least the heavy duty industrial vehicle can be run, even if the controller for controlling the working machine fails or is not connected to the network.

That is, limited operation means, called a degradation mode, is set, whereby even if one of the plurality of controllers fails or is not connected to the network, a limited operation can be performed, permitting the vehicle to run. The subject of the limited operation is not limited to a vehicle run. For example, in order to ensure safety, the action of the working machine may be limited to a minimum required one, which may be operated.

Effects of the Invention

According to the present invention, the hardware of each of the plural controllers for controlling the instruments to be controlled is rendered common. Thus, by changing only the software installed, the subject of control can be switched, and the controller with the changed software can be diverted to use on the selected instrument. As a result, the types of the parts used in the heavy duty industrial vehicle can be reduced. Moreover, the commonality of the hardware can achieve a unit price reduction due to the economies of mass production.

According to the present invention, the plurality of controllers are interconnected by the network (CANbus). Thus, the control function can be distributed among the plural controllers, and the degree of freedom of the locations of arrangement can be improved. That is, the positions of installation of the controllers can be flexibly selected according to the design of the vehicle body of the heavy duty industrial vehicle. The distributed arrangement of the controllers can markedly decrease in-vehicle wirings for operational inputs and outputs for hydraulic selector valves and many signal connections, in comparison with conventional heavy duty industrial vehicles. Also, the effect of cutting down on the wiring cost and the assembly cost is obtained. There is also produced the effect of preventing troubles, such as a break in or poor contact of sensor signal wires of the working machine or the cabin having a slide mechanism.

According to the present invention, commonality is achieved of hardware of each controller, and of the lower-level driver software for directly controlling the instruments to be controlled, in the software having the hierarchical structure. Thus, by changing only the upper-level application software utilizing the driver software, the controller with the thus changed application software can be used as a controller for controlling the different instrument to be controlled. Hence, in the event of a damage to one controller, only the application software is rewritten by use of rewriting means such as a maintenance tool. The controller used for other instrument to be controlled, if subjected to such rewriting, can be used as an alternative component for the controller which controls the desired instrument to be controlled. Thus, a step and time, which have been required for emergency saving, can be shortened.

According to the present invention, even if one controller, for example, the controller for controlling the working machine, such as the spreader, fails or is not connected to the network, other controller enables vehicle body control and cabin operation of the heavy duty industrial vehicle, thereby permitting a limited operation such as a run operation (degradation mode). Thus, a run of the vehicle becomes possible even during detachment of the working machine at the time of transportation, assemblage, or maintenance.

DETAILED DESCRIPTION OF THE INVENTION

Controllers for a heavy duty industrial vehicle according to the present invention control a plurality of instruments to be controlled, which are provided in the heavy duty industrial vehicle. Hardware of each of these controllers is rendered common, the basic features of software are also rendered common, and only the minimum required features of the software are constructed to be suitable for the instruments to be controlled. Thus, the software of the controller can be easily changed. Regardless of the instrument to be controlled, as a subject of control, the controllers can be easily diverted to use on any instruments to be controlled.

Even if a malfunction happens in other of the controllers, the controllers for the heavy duty industrial vehicle according to the present invention enter a degradation mode by a predetermined procedure, thereby enabling only a limited action, for example, a running action, to be performed.

Embodiment 1

Figure 1:
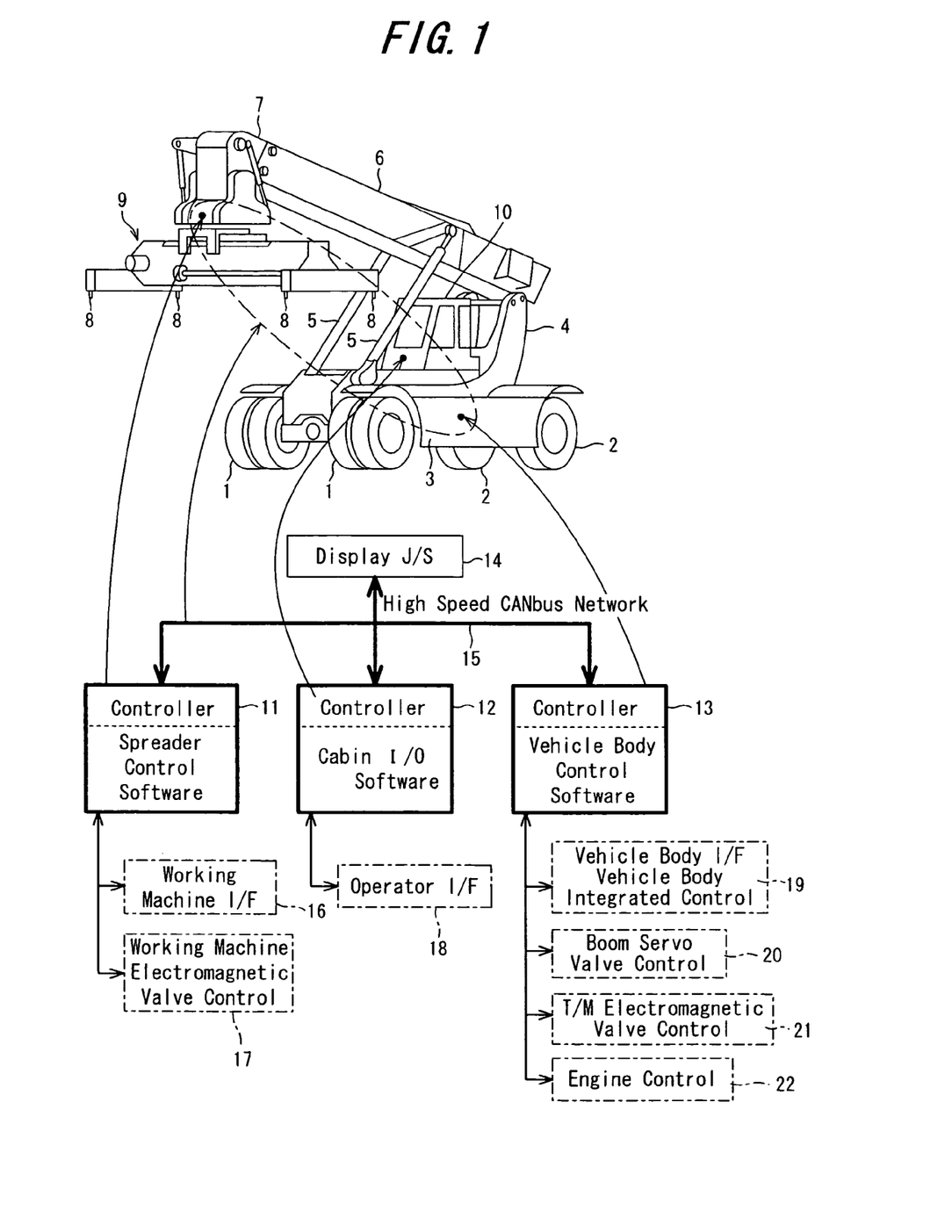
FIG. 1 is a view showing a configuration example in which controllers for a heavy duty industrial vehicle according to the present invention are used.

FIG. 1 is a view showing a configuration example in which controllers for a heavy duty industrial vehicle according to the present invention are used.

In the present invention, the heady duty industrial vehicle is explained, with a reach stacker being taken as an example. However, the present invention is not limited to the reach stacker, but can be applied to other heavy duty industrial vehicles, such as a heavy duty fork lift and a motor grader.

The reach stacker, if explained briefly, is a heavy duty, cargo-handling vehicle used for loading and unloading or movement of containers in a port, etc. The reach stacker is low in cost, corners easily, has no limitations on the distance over which it moves the container. The reach stacker can access not only the container placed at the front, but the container located at the back, and is thus a cargo handling vehicle very convenient in transshipping and moving containers.

As shown in FIG. 1, the reach stacker has a vehicle body 3 mounted with two front wheels 1 and two rear wheels 2; a boom 6 disposed above the vehicle body 3 so as to be tiltable about a stand 4 by boom cylinders 5; an arm 7 provided within the boom 6 so as to be extensible and contractible, and extended and contracted by a telescopic cylinder (not shown) provided within the boom 6; and a spreader 9 provided at a front end portion of the arm 7, adapted to be capable of making an extending and contracting motion, a rotating motion, an inclining motion, and a paralleling motion, and holding a container by four lock pins 8. A cabin 10 is disposed on the upper surface of the vehicle body 3 and below the boom 6, at a position where visibility during work is satisfactory. An operator can perform a moving action for the reach stacker itself, or a holding action or an installing action for the container, with the use of an operating panel within the cabin 10.

In the heavy duty industrial vehicle, the working machine is configured so as to be capable of performing a predetermined working procedure. In the reach stacker, for example, the spreader 9 serves as the working machine. As the controllers, the reach stacker has a controller 11 for controlling the spreader 9, a controller 13 for controlling the vehicle so as to move it, and a controller 12 for controlling an operation performed by the operator. These controllers control, independently of each other, the spreader 9, the vehicle body 3 and the cabin 10, respectively, which are instruments to be controlled. In addition, the reach stacker has a display and J/S (joystick) 14 for indicating information to the operator, and indicating operator guidance from the operator. These controllers are interconnected by a high speed CANbus network (hereinafter referred to simply as CAN) 15. Each controller exchanges necessary control information with one another in real time, and performs a control action for each instrument to be controlled. The controller 13, as a main controller, monitors the other controllers 11 and 12, and controls the entire vehicle in an integrated manner. That is, these three controllers, which are interconnected by the CAN 15, constitute a so-called distributed network having capabilities or functions distributed among them.

The above controllers are each composed of CPU (processing circuit), a storage region (having ROM containing control software and data, and RAM serving as an arithmetic work area), and an I/F (interface) circuit which is a processing circuit for input and output signals.

Since the plurality of controllers are constituted as the distributed network, the controllers can be arranged in proximity to the instruments to be controlled, as compared with the conventional controller which, singly, controls all the instruments to be controlled. Thus, the wirings between the controllers and the instruments to be controlled can be markedly reduced. Since control signals can be exchanged through a single cable for CAN, moreover, the structures between the instruments are simplified. Thus, the number of man-hours required for assembly can be markedly decreased, and the wirings themselves can be cut down on, so that the rate of failures due to a wire break, etc. can be reduced. Furthermore, a quick response at the time of failure becomes possible.

In the reach stacker shown in FIG. 1, the controller 11 for controlling the spreader, the controller for the cabin I/O, and the controller 13 for vehicle body control have an exactly common hardware configuration, and use exactly common driver software for setting the actions of the hardware, and for directly actuating control instruments. However, application software for controlling, by use of the driver software, the instruments to be controlled is the only tool that is different among the different controllers. For example, the controller 11 for controlling the actions of the spreader has spreader control software as the application software, the controller 12 for controlling operations from the operator has cabin I/O software as the application software, and the controller 13 for controlling the actions of the vehicle body has vehicle body control software as the application software. Details for these features will be offered later.

In the above features, the controller 11, for controlling the actions of the spreader 9, sends control signals to the respective control instruments for the spreader via a working machine I/F 16 to drive motors, and acquires detection signals from sensors to detect the acting state of the spreader, for example, the positions of the lock pins, the inclination angle of the spreader, and so forth. Moreover, the controller 11 lights a warning lamp for indicating that the operation is in progress. The controller 11 also uses working machine electromagnetic control 17 to exercise action control over an electromagnetic valve, thereby controlling the actions of hydraulic cylinders for effecting an extending and contracting action and an inclining action of the spreader 9.

The controller 12 acquires input signals from the cabin 10, such as an accelerator pedal and a brake pedal, via an operator I/F 18, and transmits control information to the controllers 11 and 13 via the CAN 15 to control the action of the vehicle 3 and the spreader 9.

The controller 13 takes charge of the integrated control of the vehicle by vehicle integrated control 19, and also controls the vehicle body 3 with the use of vehicle body I/F 19. In addition, the controller 13 uses boom servo valve control 20 to exercise action control over the boom 6, uses T/M (transmission) electromagnetic valve control 21 to exercise action control over T/M, and uses engine control 22 to exercise action control over the engine, concretely, control of the oil pressure of the engine and control over a battery.

The display and J/S 14 may be those in a configuration comparable to that of any of the above-described controllers. However, the display and J/S 14, unlike the other controllers, are not required to involve many types of input and output signals, but need to give output signals for indication on the display. Thus, they use a dedicated controller to issue signals to the display and acquire signals from the J/S. Even in this case, they have a common communication capability, and can exchange control signals and vehicle information via the CAN 15, independently of the controllers 11, 12, 13. Concretely, information such as a vehicle posture or an error code during the operation of the spreader is indicated on the display 14 with the use of vehicle information acquired from the controller 11 and the controller 13. Also, an operator guidance from the operator, which has been inputted from the J/S 14, is acquired by the dedicated controller, which transmits such operational information to the controllers 11 and 13 via the CAN 15 to control the action of the spreader 9 and the action of the vehicle 3.

In the reach stacker of the above configuration, while referring to the work situation (assembled form of cargo, posture of the vehicle, weight of the container, angle of the boom, extension or contraction of the arm, etc.) and the vehicle situation (rotational speed of the engine, speed of the vehicle, etc.) indicated in colors on the display 14, the operator within the cabin 10 operates the J/S 14 on the operating panel of the cabin 10 to perform a moving action of the vehicle body 3, an inclining action of the boom 6, an extending and contracting action of the arm 7, and an extending or contracting action, a rotating action, and a holding action of the spreader 9. For example, in a run with the container being held, control is exercised such that the vehicle body 3 can run, while the spreader 9 is held in a stable posture which enables the run. The stable state of the vehicle is indicated on the display 14. If there is a possibility that the stable posture of the vehicle will be destroyed by an up-slope or the like, for example, control is exercised such that a warning is issued at once to keep a stable posture automatically or manually.

Figure 2:
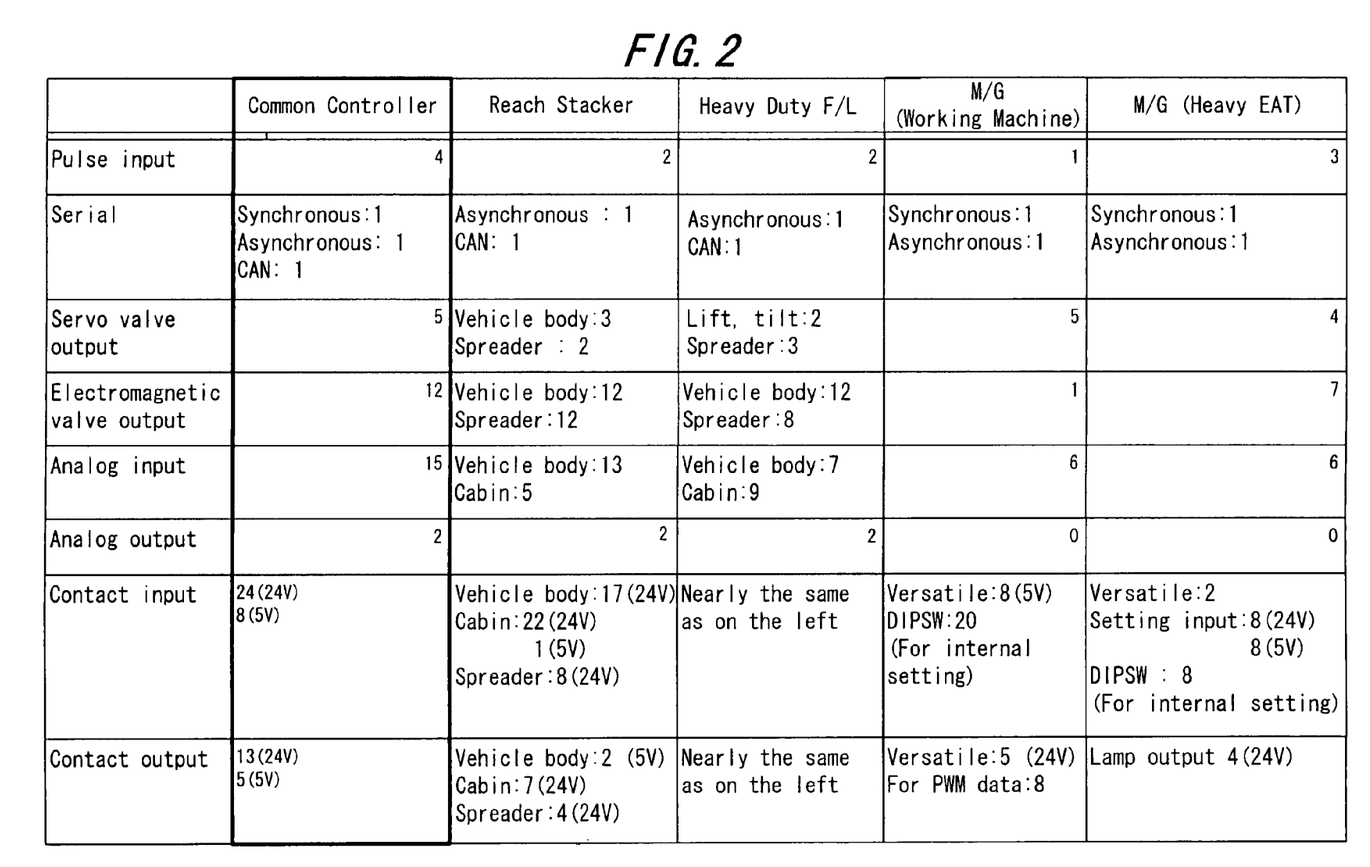
FIG. 2 is a table showing a constitution example of input/output signals of the controllers for the heavy duty industrial vehicle according to the present invention.

FIG. 2 shows a constitution example of input/output signals of the controllers for the heavy duty industrial vehicle according to the present invention.

For comparisons, the table in this drawing also shows the constitution of input/output signals required by the controllers which are used in a general reach stacker, a heavy duty F/L (fork lift), and M/G (motor grader).

The controllers for a heady duty industrial vehicle according to the present invention, concretely, have 4 connections for pulse input signals from the instruments to be controlled, 1 connection each for serial signals for synchronous mode, asynchronous mode, and CAN, 5 connections for output signals to the servo valve, 12 connections for outputs to the electromagnetic valve, 12 connections for analog input signals, 2 connections for analog outputs, 24 connections for contact inputs (24V) and 8 connections for contact inputs (5V), and 13 connections for contact outputs (24V) and 5 connections for contact outputs (5V). These are the maximum numbers of connections for inputs and outputs required of the instruments to be controlled, and they are common to these controllers. The capacities of the inputs to and outputs from the contacts (e.g., voltage, etc.) are also the maximum required capacities, and they are common to the controllers. These values correspond to specifications satisfying the requirements for the general reach stacker that are listed in the column on the right of the common controller in FIG. 2. These values also sufficiently fulfill the specifications for the heavy duty F/L and M/G listed at the same time, and can be applied to other heavy duty industrial vehicles as well as the reach stacker.

That is, for the commonality of hardware among the controllers, not only the hardware configuration within the controllers, but also the connectors for input and output signals are rendered common, and their positions of arrangement are also rendered exactly identical. Moreover, each of the controllers is entirely boxed to improve dust-proof properties, and when the controller is to be replaced, it suffices to replace its connectors, thereby enabling a predetermined action.

Figure 3:
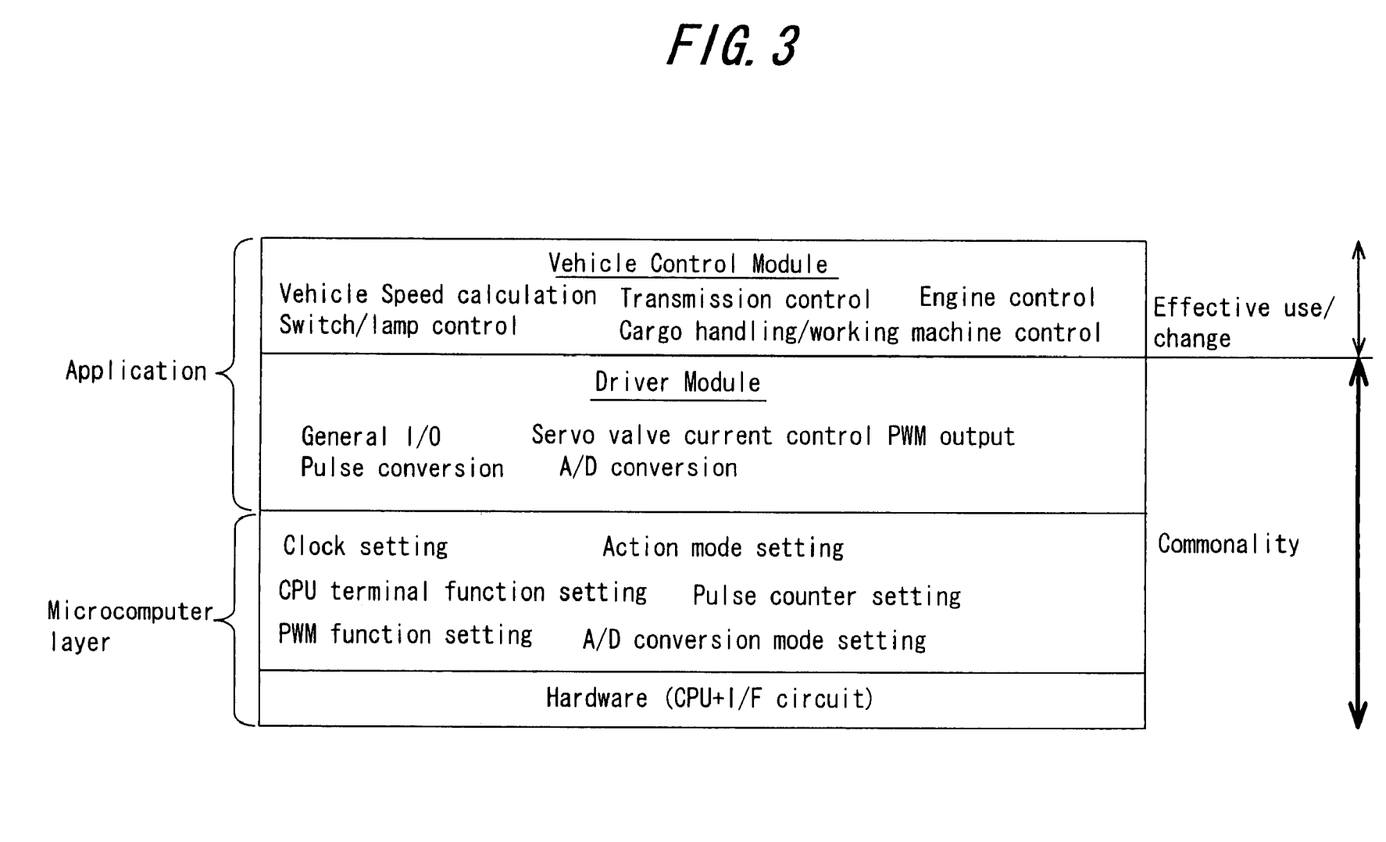
FIG. 3 is a view showing an example of the logic configuration of the controllers for the heavy duty industrial vehicle according to the present invention.

FIG. 3 shows an example of the logic configuration of the controllers for the heavy duty industrial vehicle according to the present invention.

FIG. 3 illustrates a logic configuration example of the controller for performing vehicle control. However, the controllers for spreader control and cabin control have exactly the same configuration, except for a vehicle control module portion corresponding to application software.

In the logic configuration of the controller for the heavy duty industrial vehicle according to the present invention, concretely, the structures of the CPU and I/F circuit corresponding to hardware are exactly common. Not only the portion corresponding to a physical configuration (i.e., hardware), but also the configuration of portions corresponding to the setting of hardware inside the controller, concretely, settings for a clock, an action mode, CPU terminal function, a pulse counter, PWM (pulse width modulator) function, and an A/D conversion mode, are exactly common, and a so-called microcomputer layer is used as a common platform.

Furthermore, the zone of the application layer constituting the software is constructed in a hierarchical structure, and the lower level of the application layer, namely, a driver module having driver software for directly receiving and outputting control signals from and to the instruments to be controlled, is constructed in a completely common configuration. Concretely, a general I/O, a servo valve current control PWM output, pulse conversion, and A/D conversion are used as a common configuration. The driver module and the microcomputer layer are of exactly the same configuration among the controllers. On the other hand, a control module, which is the upper level of the application layer and utilizes the driver software, for example, if it is a vehicle control module, has application software for vehicle control. Depending on which of the instruments to be controlled the vehicle control module controls, the configuration of the vehicle control module becomes different. Concretely, the vehicle control module has software for effecting vehicle speed calculation, transmission control, engine control, switch/lamp control, and cargo handling/working machine control. That is, this portion of the control module is installed with application software for a spreader control module in the case of the spreader, or application software for a cabin control module in the case of the cabin. Furthermore, only this control module portion is replaced according to the instrument to be controlled, whereby the control module portion can function as any of the controllers, and its diverted use is facilitated.

The common driver module (drive software) is held in the ROM (read only memory) inside the controller. The control module at the level upward of the driver module utilizes this driver module to control the action of the instrument to be controlled. The control module (application software) is rewritable according to a predetermined procedure, and is held in a rewritable ROM (e.g., flash ROM).

Next, the procedure in the event of a failure in the controller will be described with reference to flow charts shown in FIG. 4 and FIG. 5.

Figure 4:
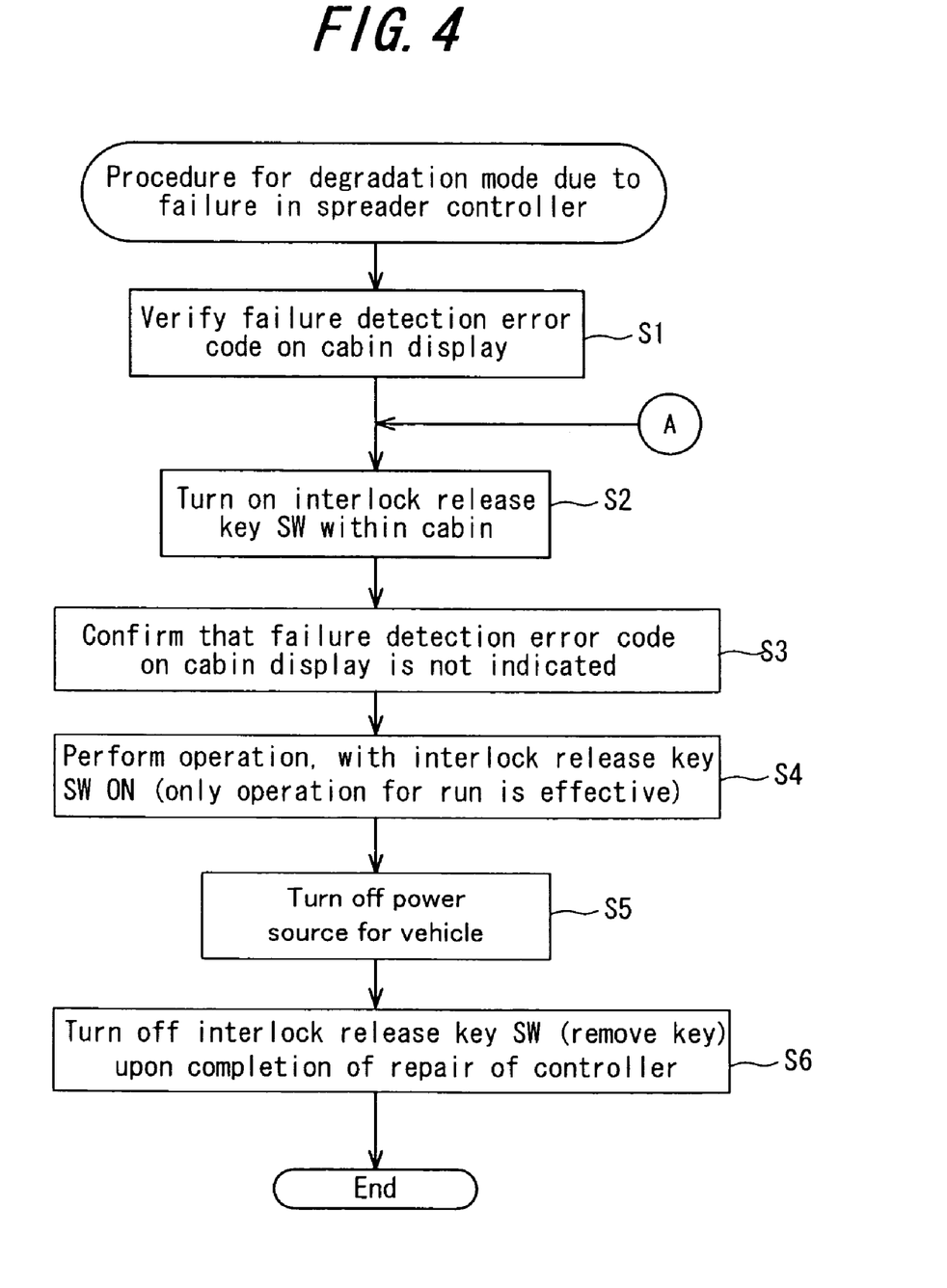
FIG. 4 is a flow chart illustrating a procedure in the event of a failure in the controllers for the heavy duty industrial vehicle according to the present invention.

For example, the procedure for a degradation mode in the case of a failure in the controller for spreader control is shown in the flow chart of FIG. 4.

(Step S1)
A failure detection error code on the display 14 within the cabin 10 is verified. At this time, this code is confirmed to be an error code showing a malfunction in the controller for the spreader.

(Step S2)
An interlock release key SW on the operating panel within the cabin 10 is turned on.

(Step S3)
It is confirmed that the failure detection error code is not indicated on the display 14 within the cabin 10. If there is a malfunction in the spreader controller, the interlock release key SW transiently releases interlock in disregard of an error in the spreader controller, instead of disabling an operation of the spreader 9 itself. On this occasion, an indication of the failure detection error code on the display 14 is also transiently stopped.

(Step S4)
An operation is performed, with the interlock release key SW remaining ON. That is, the operation of the spreader 9 is disabled, and other operation, for example, only an operation for running of the vehicle, is enabled. This is the degradation mode (limited operation means), which enables a limited operation even in a state where one of the three controllers is not connected, or there is no operating machine such as the spreader 9. In the reach stacker, according to the degradation mode, the vehicle is rendered capable of running, with the spreader 9 being located at a safe position.

(Step S5)
The power source for the vehicle is turned off.

(Step S6)
After a repair or replacement of the spreader controller is completed, the interlock release key SW is turned off (the key is removed). Then, it is confirmed that the failure detection error code is not indicated on the display 14 within the cabin 10.

Figure 5:
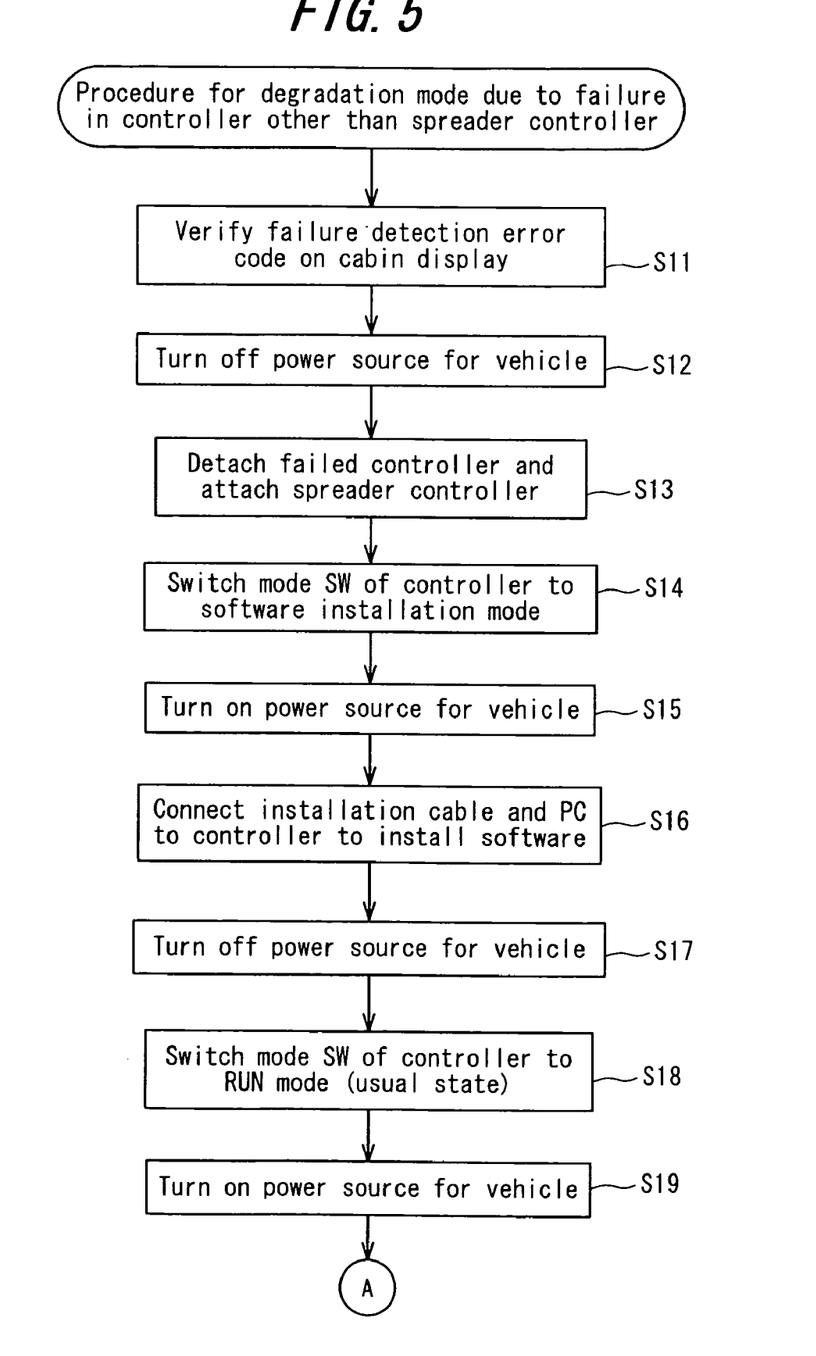
FIG. 5 is a flow chart illustrating another procedure in the event of a failure in the controllers for the heavy duty industrial vehicle according to the present invention.

The procedure for the degradation mode in the case of a failure in the controller for controlling other member than the spreader 9 is shown in the flow chart of FIG. 5.

(Step S11)

A failure detection error code on the display 14 of the cabin 10 is verified. At this time, this code is confirmed to be an error code showing a malfunction in the controller for other member than the spreader, for example, the vehicle body controller.

(Step S12)

The power source for the vehicle is turned off.

(Step S13)

The spreader controller and the failed vehicle body controller are both detached, and the spreader controller is attached as a vehicle body controller for serving as a new vehicle body controller.

(Step S14)

A mode SW of the new vehicle body controller is switched to a software installation mode (rewriting means).

(Step S15)

The power source for the vehicle is turned on.

(Step S16)

An installation cable and PC (computer) are connected to the new vehicle body controller to install application software for the vehicle body controller.

(Step S17)

The power source for the vehicle is turned off.

(Step S18)

The mode SW of the new vehicle body controller is switched to a RUN mode (usual state).

(Step S19)

The power source for the vehicle is turned on.

Then, the procedure starting with Step S2 in the flow chart shown in FIG. 4 is performed (point A in FIG. 4).

INDUSTRIAL APPLICABILITY

The present invention is not limited to the reach stacker, but can be applied to other heavy duty industrial vehicles, including a heavy duty fork lift and a motor grader.

The invention claimed is:

1. Controllers for a heavy duty industrial vehicle, which are a plurality of controllers provided in said heavy duty industrial vehicle equipped with a working machine for performing predetermined work, said plurality of controllers being adapted to control, independently of each other, a plurality of instruments to be controlled, including said working machine, said instruments being provided in said heavy duty industrial vehicle, wherein a configuration of hardware of said plurality of controllers is entirely common, and wherein software for controlling each of said instruments to be controlled is of a hierarchical structure, driver software at a lower level for directly controlling each of said instruments to be controlled is common, and only application software at an upper level utilizing said driver software is different according to a function of each of said instruments to be controlled.

2. The controllers for a heavy duty industrial vehicle according to claim 1, wherein said plurality of controllers is interconnected by a network.

3. The controllers for a heavy duty industrial vehicle according to claim 1, further comprising:

rewriting means for making only said application software rewritable.

4. The controllers for a heavy duty industrial vehicle according to claim 1, further comprising:

limited operation means for enabling an operation by other said controller so that at least said heavy duty industrial vehicle can be run, even if said controller for controlling said working machine fails or is not connected to said network.

5. The controllers for a heavy duty industrial vehicle according to claim 2, further comprising:

limited operation means for enabling an operation by other said controller so that at least said heavy duty industrial vehicle can be run, even if said controller for controlling said working machine fails or is not connected to said network.

6. The controllers for a heavy duty industrial vehicle according to claim 3, further comprising:

limited operation means for enabling an operation by other said controller so that at least said heavy duty industrial vehicle can be run, even if said controller for controlling said working machine fails or is not connected to said network.

* * * * *